Figure 1:
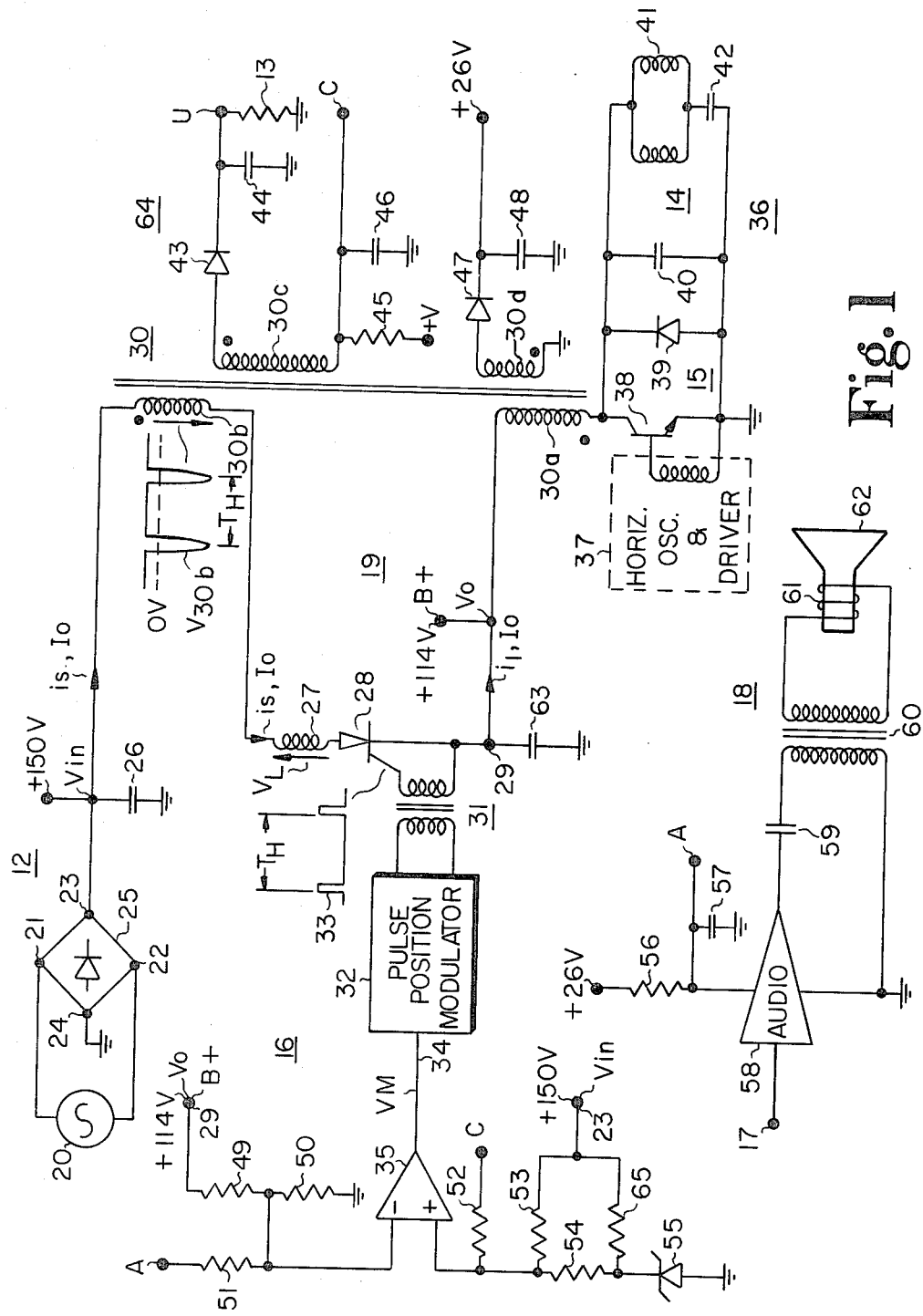

United States Patent [19]

Luz

[11] 4,298,829
[45] Nov. 3, 1981

[54] POWER SUPPLY AND DEFLECTION CIRCUIT WITH RASTER SIZE COMPENSATION

[75] Inventor: David W. Luz, Indianapolis, Ind.
[73] Assignee: RCA Corporation, New York, N.Y.
[21] Appl. No.: 119,990
[22] Filed: Feb. 8, 1980
[51] Int. Cl.³ .......................................... H01J 29/70
[52] U.S. Cl. ................... 315/408; 315/371; 315/411
[58] Field of Search ...................... 315/371, 408, 411

[56] References Cited

U.S. PATENT DOCUMENTS

| | | | |
|---|---|---|---|
| 3,626,238 | 12/1971 | Forster | 315/1 |
| 4,010,401 | 3/1977 | Yasumatsuya et al. | 315/411 X |
| 4,104,567 | 8/1978 | Peer et al. | 315/387 |
| 4,146,823 | 3/1979 | Dietz | 315/408 |
| 4,176,304 | 11/1979 | Scott | 315/411 |
| 4,223,251 | 9/1980 | Haferl | 315/371 X |
| 4,227,125 | 10/1980 | Bohringer | 315/411 |
| 4,232,254 | 11/1980 | Haferl | 315/408 |
| 4,234,829 | 11/1980 | Willis | 315/411 |
| 4,240,012 | 12/1980 | Willis | 315/408 |

*Primary Examiner*—Malcolm F. Hubler
*Attorney, Agent, or Firm*—Paul J. Rasmussen; William H. Meagher; Joseph Laks

[57] ABSTRACT

A deflection generator periodically applies a trace voltage to a deflection winding to produce scanning current and periodically generates a retrace pulse voltage across the deflection winding. A supply voltage source develops the trace voltage and also provides energy to circuits, such as a high voltage circuit, coupled to windings of a flyback transformer. The high voltage circuit develops an ultor accelerating potential from the retrace pulse voltage developed across the high voltage winding of the flyback transformer. A controllable switch such as an SCR is coupled to the source and to a secondary winding of the flyback transformer. The trace voltage and energy transfer is regulated by controlling the conduction time of the SCR. The high voltage and other load circuits draw load current from the source through the flyback transformer secondary winding during retrace, resulting in high voltage retrace pulse duration and amplitude variation with variations in load current. To maintain a constant raster width, the conduction time of the SCR is varied such that the trace voltage magnitude varies in the same sense as the retrace pulse voltage amplitude variations.

16 Claims, 2 Drawing Figures

POWER SUPPLY AND DEFLECTION CIRCUIT WITH RASTER SIZE COMPENSATION

This invention relates to raster size compensation for power supply and deflection circuits.

In typical television receiver circuitry, raster size is inversely proportional to the square root of the ultor accelerating potential and, with respect to raster width, or raster size in the horizontal direction, is directly proportional to the B+ scanning voltage. For circuits deriving the ultor accelerating potential from retrace pulse voltages developed in a flyback transformer high voltage winding, raster size may be maintained constant, ideally, by maintaining constant the B+ scanning current.

Because the high voltage circuit exhibits a certain amount of source impedance, increasing the load current drawn from the ultor terminal will result in a decreased ultor accelerating potential even though the B+ voltage is maintained constant by the regulator circuit of the power supply. Thus, raster width tends to change with ultor loading variations, the raster width tending to increase with increased ultor loading.

Switched mode power supplies which derive the B+ voltage from a source of unregulated DC supply voltage maintain a constant B+ voltage by controlling the conduction time of the regulator switch. One type of switching power supply includes the series arrangement of an SCR, a flyback transformer secondary winding, and an inductor, the arrangement being coupled across two supply terminals. The unregulated DC voltage is applied to the first terminal and a regulated B+ scanning voltage is developed at the second terminal.

A regulator control circuit turns on the SCR at a controlled instant within the trace interval of each horizontal deflection cycle to cause current to flow from the unregulated input terminal to the regulated output terminal through the series path of the flyback transformer secondary winding, the anode-to-cathode path of the SCR and the inductor. After the SCR is turned on during the trace interval, an increasing sawtooth current flows in this path. During the retrace interval, the flyback transformer secondary winding applies a negative retrace pulse voltage to the series arrangement of the SCR and the inductor, causing the current in the SCR and inductor to decrease in a sawtooth fashion until the SCR is commutated out of conduction within the retrace interval. To regulate the B+ voltage developed, the regulator control circuit senses B+ voltage variations and varies the turn-on instant of the SCR within the trace interval.

As mentioned previously, increased ultor loading tends to increase the raster width even with a constant B+ voltage. To maintain a constant width with ultor load variations, conventional regulator circuits, including the above-described SCR switching type circuits, develop a sense voltage representative of ultor load current variations and apply this sense voltage to the regulator control circuit to decrease the B+ voltage with increased beam loading. The decreased B+ voltage tends to decrease the raster width, opposing the tendency of the raster width to increase with increasing beam loading.

Other DC supply voltages may be derived from the voltages developed across windings of the flyback transformer. These auxiliary voltages may energize such load circuits as the vertical deflection circuit, the video circuit, and the audio circuit. The load current drawn by these auxiliary load circuits is reflected through the flyback transformer and appears as a DC load current component flowing from the unregulated DC supply terminal.

In the aforementioned SCR type switching supply, the current drawn by the auxiliary load circuits results in a DC component of current flowing in the SCR-coupled flyback transformer secondary winding that is a function of the auxiliary loading. Variations in load current being drawn by the auxiliary circuits result in variations in the current flowing through this secondary winding during the retrace interval.

Current variations in the SCR-coupled secondary winding cause a retrace pulse voltage amplitude modulation of a sense opposite that caused by ultor beam current variations, as will be explained later. Thus, increasing the load current drawn by the auxiliary loads will result in a shortening of the retrace pulse duration and an increase in the retrace pulse voltage amplitude. The ultor accelerating potential and the raster width will therefore tend to undesirably increase with increased current flowing through the SCR-coupled secondary winding due to auxiliary circuit loading, even when the ultor loading is unchanged.

A feature of the invention is to provide raster size compensation as the current in the SCR-coupled winding of the flyback transformer varies due to load current variations. An input voltage representative of variations in the auxiliary load circuit current magnitude is developed and applied to the regulator control circuit of a controllable switch or SCR. This input voltage is applied in such a manner as to alter the trace voltage magnitude in the same sense as the magnitude alterations of the current flowing in the SCR-coupled winding.

In a specific example, a series resistor is located in the supply voltage circuit of an audio circuit. Increased audio loading by the audio circuit causes an increased voltage drop to be developed across this sensing resistor. The voltage drop is applied to the regulator control circuitry such that an increase in audio load current results in the SCR being gated into conduction earlier within the trace interval, tending to increase the B+ scanning voltage and the trace voltage applied to the horizontal deflection winding. Since the increased audio loading undesirably tends to increase the retrace pulse voltage amplitude and ultor accelerating potential, as mentioned previously, increasing the trace voltage will increase the scanning current to maintain a constant raster width.

Figure 2:
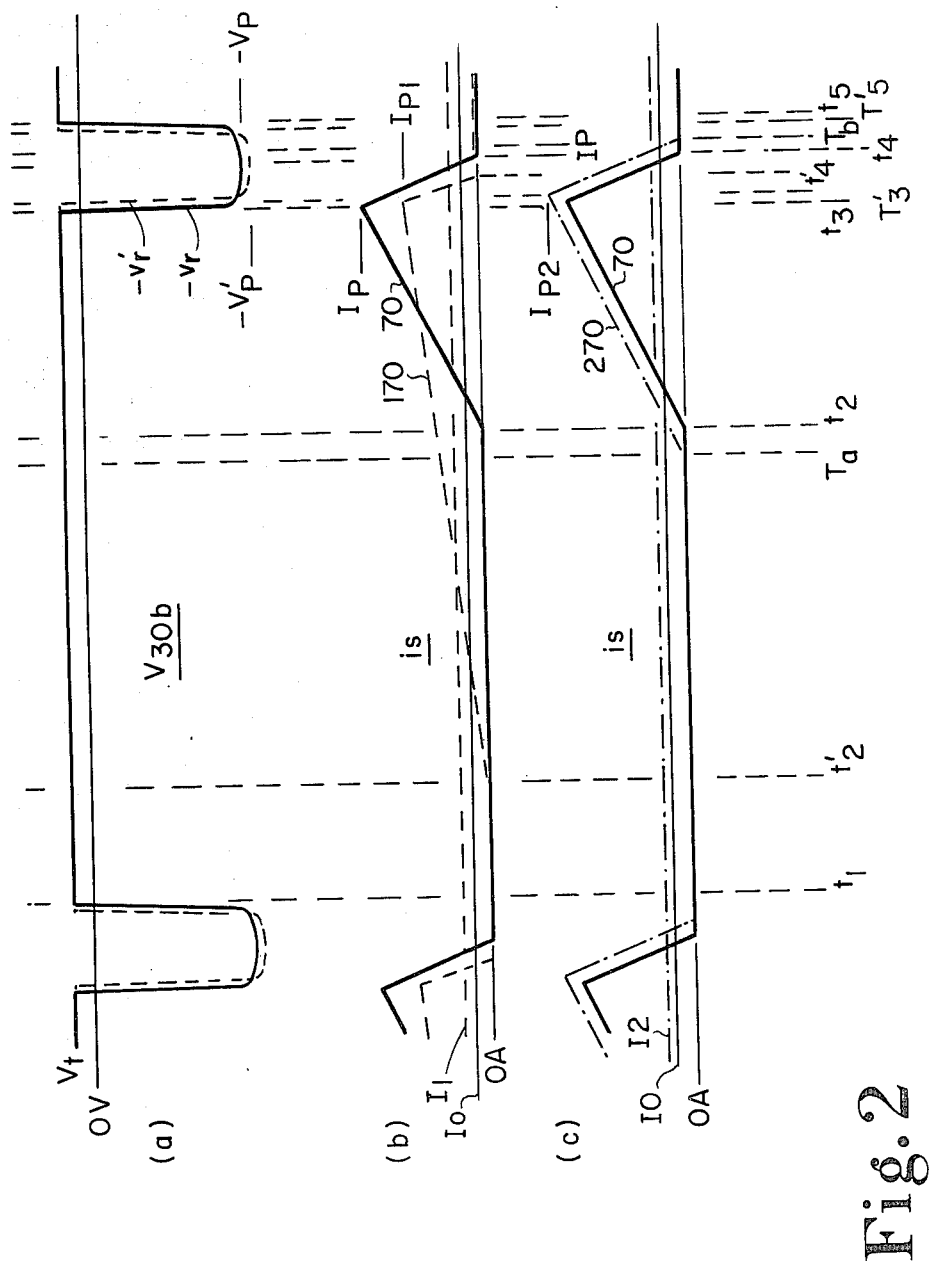

FIG. 1 illustrates a power supply and deflection circuit with raster size compensation embodying the invention; and FIG. 2 illustrates waveforms associated with the circuit of FIG. 1.

In FIG. 1, an unregulated DC input supply 12 includes a source 20 of alternating current AC line or mains supply voltage coupled to terminals 21 and 22 of a full-wave bridge rectifier 25. Coupled across terminals 23 and 24 of bridge rectifier 25 is a filter capacitor 26. An unregulated input supply voltage, $V_{in}$, of illustratively +150 volts DC, is developed at terminal 23. The unregulated DC supply voltage $V_{in}$ is applied to an SCR switching regulator 19 to develop a regulated B+ scanning voltage, $V_0$, of illustratively +114 volts DC, at an output terminal 29.

Switching regulator 19 comprises the series arrangement of a secondary winding 30b of a horizontal output or flyback transformer 30, an inductor 27 and an SCR 28, the series arrangement being coupled across terminals 23 and 29. A regulator control circuit 16 provides pulse position modulated gating pulses 33 to SCR 28, repeating at the horizontal deflection frequency, $1/T_H$. Gating pulses 33 turn on SCR 28 at a controlled instant within the trace interval of each horizontal deflection cycle to generate a current $i_s$ flowing from the unregulated supply input terminal 23 to output terminal 29 through the series arrangement of regulator secondary winding 30b of flyback transformer 30, inductor 27 and the anode-to-cathode path of SCR 28. During retrace, the negative horizontal retrace pulse voltage of the voltage $V_{30b}$ developed across regulator secondary winding 30b of flyback transformer 30 is applied to the series coupled inductor 27 and SCR 28 in order to commutate off the SCR within the retrace interval. A capacitor 63 filters the horizontal rate ripple voltage developed at output terminal 29.

The B+ scanning voltage developed at terminal 29 is applied through a primary winding 30a of flyback transformer 30 to a horizontal deflection winding 41 to develop a trace voltage across a capacitor 42 and to the collector of a horizontal output transistor 38 of a deflection generator 36. Horizontal deflection generator 36 comprises a conventional horizontal oscillator and drive circuit 37, a trace switch 15 comprising horizontal output transistor 38 and a damper diode 39, a retrace capacitor 40 and the S-shaping or trace capacitor 42. Trace capacitor 42 is series arranged with deflection winding 41 across trace switch 15 and retrace capacitor 40. The DC value of the trace voltage developed across trace capacitor 42 equals the B+ scanning voltage, $V_0$.

During the trace interval with trace switch 15 conducting, the trace voltage is applied across horizontal deflection winding 41 to produce a sawtooth scanning current in the deflection winding. At the end of the trace interval, trace switch 15 becomes nonconductive. Horizontal deflection winding 41 and retrace capacitor 40 then form a resonant retrace circuit 14 to generate a retrace pulse voltage across the deflection winding during the horizontal retrace interval. The retrace pulse voltage developed across horizontal deflection winding 41 is applied to flyback transformer primary winding 30a to develop retrace pulse voltages across other windings of the flyback transformer, such as regulator secondary winding 30b, a high voltage secondary winding 30c and another secondary winding 30d.

The high voltage retrace pulse voltage developed across high voltage winding 30c is rectified by a diode 43 and filtered by a capacitor 44 of a high voltage circuit 64 to produce a DC ultor accelerating potential at a terminal U, with the ultor load being schematically represented as an impedance 13. Ultor beam current flows from terminal U through impedance 13.

The voltage across secondary winding 30d is rectified during trace by a diode 47 and filtered by a capacitor 48 to provide illustratively a +26 volt DC auxiliary supply for such auxiliary load circuits as the vertical deflection circuit and the audio circuit.

Audio circuit 18, for example, comprises an audio amplifier 58 with an output terminal AC coupled through a capacitor 59 to the primary winding of a transformer 60. The secondary winding of transformer 60 is coupled to the voice coil 61 of a loudspeaker 62. Audio frequency signals are applied to input terminal 17 of audio amplifier 58. These signals are amplified by audio amplifier 58 to generate current in voice coil 61, thereby producing sound emanations from loudspeaker 62 in accordance with the sound information content of the signals.

Power supply voltage for audio circuit 18 is derived from the +26 volt DC auxiliary supply voltage and coupled to the audio circuit through a resistor 56. A transient filter capacitor 57 is coupled to a resistor 56 at a terminal A.

The load currents drawn by load circuits coupled to secondary windings of flyback transformer 30, such as high voltage secondary winding 30c and auxiliary supply secondary winding 30d, are reflected back into flyback transformer primary winding 30a as a component of the current $i_1$ being drawn from B+ supply voltage terminal 29. The DC component or average value $I_0$ of the current $I_1$ is determined by the average values of the load currents drawn by all television receiver load circuits coupled to terminal 29, either magnetically, through the flyback transformer secondary windings, or conductively, such as by horizontal deflection generator 36 which draws a load current to replenish dissipative losses.

The source supply terminal for the DC current $I_0$ is the unregulated input supply terminal 23 by way of the series arrangement of SCR 28, inductor 27 and regulator secondary winding 30b. Thus, the DC current component or the average value of the input current $I_s$ flowing from terminal 23 equals the same average load current $I_0$ flowing from terminal 29. Energy is transferred from the unregulated supply 12 to such load circuits as the high voltage circuit and the audio circuit by means of various ones of the windings of flyback transformer 30.

To provide B+ scanning voltage regulation, a voltage representative of variations in the voltage $V_0$ of the B+ scanning voltage is applied to regulator control circuit 16 as a negative feedback voltage. This B+ negative feedback voltage is developed across a resistor 50 of a voltage divider coupled between B+ terminal 29 and ground, the voltage divider comprising a resistor 49 and resistor 50.

The B+ feedback voltage developed across resistor 50 is applied to an inverting terminal of a comparator 35 of regulator control circuit 16. A reference voltage developed across a zener diode 55 is applied to the noninverting input terminal of comparator 35 through a resistor 54. Bias current for zener diode 55 is obtained from the unregulated input terminal 23 through a resistor 65.

The output of comparator 35 comprises a DC control voltage $V_M$ applied to a conventional pulse position modulator 32 along a conductor line 34. The pulse position modulated gating pulses 33 are developed by modulator 32 and AC coupled to SCR 28 through a transformer 31. The occurrence of the leading edge of each gating pulse 33 within the trace interval of each horizontal deflection cycle is determined by the value of the DC control voltage $V_M$. Increasing the DC voltage $V_M$, for example, will result in pulse position modulator 32 phase advancing gating pulse 33 within the trace interval of each horizontal deflection cycle.

The idealized voltage $V_{30b}$ developed across regulator secondary winding 30b of flyback transformer 30 is illustrated in FIG. 2a by the solid-line waveform. During the trace interval $t_1-t_3$ of each horizontal deflection cycle, the voltage $V_{30b}$ equals a relatively constant trace voltage $V_t$, positive at the undotted terminal of winding 30b. During the retrace interval $t_3$–$t_5$, the voltage $V_{30b}$ equals a negative retrace pulse voltage, $-v_r$, of peak amplitude $V_p$. Assuming a tight magnetic coupling between all the windings of flyback transformer 30, the voltages developed across other windings of flyback transformer 30 are basically of the same waveshape as that of the voltage across secondary winding 30b, illustrated in FIG. 2a.

For nominal mains supply voltage and load current conditions, pulse position modulator 32 applies a gating pulse 33 to turn on SCR 28 at an instant $t_2$ of FIG. 2b. Prior to time $t_2$, before turn-on of SCR 28, the voltage across inductor 27 is zero. With SCR 28 conducting after time $t_2$, the voltage across inductor 27 during the remainder $t_2$–$t_3$ of the trace interval is $V_L = \Delta V + V_t$, where $\Delta V = V_{in} - V_0$. The current $i_s$, illustrated in FIG. 2b as the solid-line waveform 70, increases in a sawtooth manner from zero at time $t_2$ to a peak value $I_p$ at time $t_3$, with the current slope being determined by the magnitude and polarity of the voltage $V_L$.

During retrace, when SCR 28 is conductive between times $t_3$–$t_4$, the voltage $V_L$ across inductor 27 reverses polarity when the negative retrace pulse voltage $-v_r$ developed across secondary winding 30b is applied to the series arrangement of inductor 27 and SCR 28. During the portion $t_3$–$t_4$ of the retrace interval, the voltage across inductor 27 is $V_L = \Delta V - v_r$. Thus, with a negative voltage being developed across inductor 27, beginning at time $t_3$, the current $i_s$ decreases in a sawtooth fashion, as illustrated in FIG. 2b, until it attempts to reverse direction near time $t_4$, thereby commutating off SCR 28. During the remainder $t_4$–$t_5$ of the retrace interval and during the first portion $t_1$–$t_2$ of the trace interval, the current $i_s$ equals zero since SCR 28 is nonconductive.

The current $i_s$ flowing from unregulated input supply terminal 23 through the series arrangement of secondary winding 30b, inductor 27 and SCR 28 to B+ terminal 29 for low mains conditions is illustrated by the dashed-line sawtooth waveform 170 of FIG. 2b between times $t_2'$–$t_4'$. The low mains supply voltage condition results in a shallower slope to the positive-going sawtooth portion of the current $i_s$ during trace, a steeper negative-going slope to the current $i_s$ during retrace, and a lower peak current $I_{p1}$ when compared to the same quantities under nominal mains supply voltage conditions.

Should the B+ scanning voltage $V_0$ tend to decrease due to, for example, a decrease in mains supply derived voltage $V_{in}$, a decreased B+ feedback voltage is applied to the inverting input terminal of comparator 35, resulting in an increased DC control voltage $V_M$. Gating pulses 33 are phase advanced within the trace interval to the instant $t_2'$, as illustrated in FIG. 2b. The conduction time of SCR 28 is thus increased and equals the duration of the interval $t_2'$–$t_4'$. The conduction time increase is required in order to maintain a relatively constant B+ voltage. This conduction time increase is provided by the negative B+ feedback circuit which tends to prevent any substantial B+ voltage decrease if the feedback loop gain is sufficiently great.

The input current $i_s$ for nominal mains supply voltage and load current operating conditions is reproduced in FIG. 2c as the solid-line sawtooth waveform between times $t_2$–$t_4$. The average value of the sawtooth waveform 70 equals the DC current component or average load current value $I_0$ of the current $i_s$.

If, due to an increased power demand by the television receiver circuits, the average load current component of the current $i_1$ increases to a value $I_2$, the voltage $V_0$ at B+ terminal 29 tends to decrease. This decrease in B+ scanning voltage is sensed at the inverting input terminal of comparator 35 to provide an increase in the DC control voltage $V_M$, resulting in a phase advance to gating pulse 33 to turn the SCR on earlier within the trace interval at time $T_a$ of FIG. 2c.

Assuming that the unregulated supply voltage $V_{in}$ is relatively unchanged despite the increased loading conditions, both the positive-going and the negative-going slope portions of the sawtooth current $i_s$, illustrated in FIG. 2c as a dashed-dotted-line waveform 270, have substantially the same slopes as those of the corresponding portions of the solid-line waveform 70. Thus, the area under the waveform 270 is greater than the area under the waveform 70, as is required to accommodate the increase of average load current to the value $I_2$.

The discrete inductor 27 of FIG. 1 may be omitted if flyback transformer 30 is constructed so as to create sufficient leakage inductance between secondary winding 30b and primary winding 30a to be able to substitute for the inductance of omitted inductor 27. Because of the presence of leakage inductance, the voltage $V_{30b}$ developed across winding 30b will differ somewhat from the waveshape illustrated in FIG. 2a.

The above discussion assumes a regulator circuit operation with only one signal voltage, i.e., the negative B+ feedback voltage, being applied to an input terminal of comparator 35. In many instances, however, it may be desirable to also apply a signal voltage representative of the ultor beam current flowing out of terminal U. During retrace, high voltage circuit 64 including impedance 13 may be considered to function as a load across retrace capacitor 40 of resonant retrace circuit 14. Increased ultor load current results in the increased loading of the resonant retrace circuit. As a result, the retrace pulse amplitude decreases and the retrace pulse duration lengthens. In combination with the effects of the increased voltage drop across the internal impedance of the high voltage circuit, the effect of increased ultor loading on the retrace pulse amplitude results in a decrease in the ultor accelerating potential. Raster width will tend to undesirably increase.

A terminal C of high voltage winding 30c remote from diode 43 is coupled through a resistor 45 to a +V direct current voltage source. A filter capacitor 46 is coupled to terminal C. The DC path for beam current flowing from ultor terminal U originates at the +V source and flows through resistor 45. With filtering provided by capacitor 46, a DC voltage is developed across resistor 45 that is representative of the ultor load current and variations thereof.

The voltage at terminal C is applied through a resistor 52 to the noninverting input terminal of comparator 35. An increase in ultor loading results in a decrease in the voltage at terminal C, resulting in a decrease in the DC control voltage $V_M$. Gating pulse 33 is phase delayed within the trace interval, resulting in a decrease of the B+ scanning voltage, thereby tends to reduce the raster width and to oppose the tendency of the raster width to increase due to increased ultor beam current loading.

A feature of the invention is to enable regulator control circuit 16 to oppose or compensate for undesirable raster width variations caused by changes in deflection circuit loading other than ultor beam current loading.

Assume, for example, that the load current drawn by audio circuit 18 from the +26 volt source increases due to a change in the nature of the audio input signals applied to terminal 17. The increased loading by audio circuit 18 results in an increased current flowing from B+ terminal 29 and an increase from $I_0$ to $I_2$ in the DC component or average current of both $i_1$ and $i_s$, as illustrated, for example, in FIG. 2c. The current $i_s$ reaches a greater peak magnitude $I_{p2}$ at the end of the trace interval. A greater current thus flows in regulator secondary winding 30b of flyback transformer 30 during the retrace interval. This greater current flow, due to the increased audio loading, has the effect of shortening the duration of the retrace pulse voltages in the flyback transformer windings, and has the effect of increasing the retrace pulse amplitudes.

As illustrated in FIG. 2a by the dashed-line waveform $-v_r'$, the retrace pulse duration under increased audio loading comprises the interval $T_3'-T_5'$ shorter than the duration of the retrace interval $t_3-t_5$ of the solid waveform $-v_r$ under nominal load conditions. The retrace pulse amplitude increases from the magnitude $V_p$ to the magnitude $V_p'$.

It is believed that this retrace pulse duration shortening and amplitude increase is due to an increase in the transfer of energy to the resonant retrace circuit 14 from secondary winding 30b by way of primary winding 30a. During retrace, the dotted terminal of secondary winding 30b is positive. With a positive current $i_s$ flowing into the positive dotted terminal of winding 30b during retrace, power flows into the winding and is thereafter transferred to resonant retrace circuit 14, resulting in a greater amplitude to the retrace pulse voltage by resonant retrace circuit 14 and a shortening of the retrace pulse duration.

An alternative explanation for the modulation of the retrace pulse amplitude and duration caused by load current changes in winding 30b involves the fact that inductor 27 is reflected by way of flyback transformer windings 30b and 30a as an inductance in parallel with deflection winding 41. The reflected inductance of inductor 27 and the reflected current flowing in the inductor during retrace changes the frequency of resonant circuit 14 established by the inductance of deflection winding 41 and the capacitance of retrace capacitor 40. The added reflected parallel inductance provided by inductor 27 and the added reflected current provided by the current $I_s$ results in establishing a higher resonant frequency for retrace circuit 14. Increased audio loading therefore results in a shortening of the retrace pulse duration and an increase in the retrace pulse amplitude. The increase in retrace pulse amplitude tends to increase the ultor accelerating potential at terminal U, resulting in an undesirable decrease in raster width.

The effect of audio loading is opposite to the effect produced by ultor beam current loading. As mentioned previously, an increase in ultor beam current loading results in a tendency for the retrace pulse amplitude and ultor accelerating potential to decrease.

Although an increase in ultor loading also results in an increase in the average current $I_0$ flowing in regulator secondary winding 30b of flyback transformer 30, the effect of reflecting the ultor load 13 to retrace pulse circuit 14 predominates over the effect of reflecting inductor 27. Thus, with increased ultor beam loading, the retrace pulse voltage amplitude tends to decrease rather than increase.

Although the amount of raster width change caused by a change in audio loading may be relatively small, these changes may be more noticeable by an observer if they occur at a relatively rapid rate. Thus, if the sound content of the input signals to terminal 17 of audio circuit 18 varies relatively rapidly at an audio rate, the observer notices the relatively rapid expansion or contraction of the raster width even though these changes are of relatively small magnitude.

To compensate for changes in raster width caused by audio loading changes of the current $i_s$ in secondary winding 30b and inductor 27, an input signal voltage representative of audio load current changes is developed across resistor 56 and at terminal A of audio circuit 18. The audio input signal voltage at terminal A is applied to the inverting input terminal of comparator 35 of regulator control circuit 16 through a resistor 51. By applying the audio input signal to the inverting terminal of comparator 35, the conduction time of SCR 28 is varied in a manner that alters or varies the B+ scanning voltage magnitude and thus the trace voltage magnitude in the same sense as the magnitude alterations of the current $i_s$ flowing in secondary winding 30b. An increase, for example, in loading of audio circuit 18 results in a decrease in the voltage at terminal A and in the voltage applied to the inverting input terminal of comparator 35. The DC control voltage $V_M$ increases, resulting in a phase advance of gating pulse 33 and an increase in the B+ scanning and trace voltages.

Since raster width is directly proportional to the trace voltage applied to deflection winding 41, an increase in the trace voltage tends to increase the raster width, thereby compensating for the tendency of the raster width to decrease with increased retrace pulse amplitude caused by increased audio loading.

The load current representative input voltage applied to control circuit 16 is in the nature of an open loop correction rather than as part of a negative feedback loop. This open loop correction can therefore result in the B+ voltage increasing to values greater than had existed prior to the change in the load current.

It should be noted that variations in unregulated input voltage $V_{in}$ may result in undesirable retrace pulse amplitude and duration modulation even when the negative feedback loop of regulator 19 attempts to maintain a relatively constant B+ voltage. Assume, for example, that the power being drawn by the television receiver load circuits coupled, either magnetically or conductively, to B+ terminal 29 remains unchanged. This power is ultimately supplied from the unregulated DC supply 12. The power provided may be computed as the product of the input voltage $V_{in}$ times the average load current $I_0$ flowing from terminal 23.

If the unregulated DC input voltage $V_{in}$ decreases, the average load current $I_0$ must increase in order to maintain an unchanged power flow out of terminal 23 in the direction of the current arrow $i_s$ in FIG. 1. Since the average load current flowing out of B+ terminal 29 is the same as the average load current flowing out of terminal 23, an increase in the average load current $I_0$ results in an increase in the average power flow out of B+ terminal 29 in the direction of the current arrow $i_1$. With the power flow out of unregulated input terminal 23 remaining unchanged, the net power flow out of secondary winding 30b must therefore typically decrease.

Thus, if the unregulated input voltage $V_{in}$ decreases, the average value of the input current $i_s$ increases, at a given power level, as illustrated by the dashed-line sawtooth waveform 170 of FIG. 2b and by the increased magnitude $I_1$ of the average load current, when compared to the average load current magnitude $I_0$ for nominal mains supply voltage conditions.

A decrease in the input voltage $V_{in}$ produces a decrease in the peak magnitude of the current $i_s$ to a value $I_{p1}$, as illustrated in FIG. 2b even though the average load current increases in magnitude to $I_1$. This decrease in peak magnitude of the current $i_s$ during retrace tends to lengthen the retrace pulse duration and decrease the retrace pulse amplitude, thereby tending to increase the raster width. These changes are due to changes in the resonant retrace circuit caused by the reflection of inductor 27 and its current into the retrace circuit 14. To compensate for this undesirable raster width modulation, the unregulated DC input voltage $V_{in}$ is applied to the noninverting input terminal of comparator 35 of regulator control circuit 16 through a resistor 53. A decrease in the voltage $V_{in}$ results in a decrease in the DC control voltage $V_M$, resulting in gating pulse 33 being phase delayed within the trace interval. Phase delaying gating pulse 33 decreases the B+ scanning voltage and the trace voltage applied to deflection winding 41. Raster width therefore tends to decrease, to oppose the tendency of the width to increase with a decrease in the DC input voltage $V_{in}$.

Other transistor or SCR switching power supply and deflection circuits, such as described in U.S. patent application Ser. No. 018,361, filed Mar. 7, 1979, by Walter Bohringer, entitled "REGULATED DEFLECTION SYSTEM", now U.S. Pat. No. 4,227,125, or such as described in U.S. patent application Ser. No. 964,538, filed Nov. 29, 1978, by P. E. Haferl, entitled "REGULATED DEFLECTION CIRCUIT", now U.S. Pat. No. 4,232,254, may also exhibit undesirable retrace pulse amplitude and duration modulation with variations in deflection circuit quantities such as the audio load current. By controlling the conduction time of the regulator switch in accordance with these variations, a relatively constant raster width may be obtained.

I claim:

1. A power supply and deflection circuit with raster size compensation, comprising:
a deflection winding;
a deflection generator coupled to said deflection winding for periodically applying a trace voltage to said deflection winding to produce scanning current in said deflection winding and for periodically generating a retrace pulse voltage across said deflection winding;
a flyback transformer with a winding coupled to said deflection generator for developing retrace pulse voltages;
a high voltage circuit coupled to a high voltage winding of said flyback transformer for developing an ultor accelerating potential from the retrace pulse voltage developed across said high voltage winding;
a load circuit coupled to a winding of said flyback transformer;
a source of supply voltage for developing said trace voltage and for providing energy to said load circuit;
a controllable switch coupled to said source and to a winding of said flyback transformer other than said high voltage winding for controlling the magnitude of said trace voltage, said high voltage and load circuits drawing current from said source through said other flyback transformer winding such that variations of a given sense in said other flyback transformer winding current produce same sense variations in retrace pulse voltage amplitude;
a control circuit coupled to said controllable switch for varying the conduction time of said controllable switch;
means for developing an input signal representative of variations in the load current drawn by said load circuit, variations in said load current producing a same sense variation in said other flyback transformer winding current; and
means for applying said input signal to said control circuit to vary the conduction time of said controllable switch in a manner that varies the trace voltage magnitude in the same sense as that of said variations in said other flyback transformer winding current.

2. A circuit according to claim 1 including means coupled to said source for developing a DC voltage at an output terminal of said controllable switch; means for developing a signal representative of variations of said DC voltage; and means for applying said DC voltage variations representative signal to said control circuit as a negative feedback signal to vary the conduction time of said controllable switch in a manner that opposes said variations of said DC voltage.

3. A circuit according to claim 1 wherein variations in a peak value of said other flyback transformer winding current during retrace produce same sense variations in said retrace pulse amplitude, said control circuit altering said trace voltage magnitude by an amount sufficient to maintain raster size substantially unchanged by said variations in said retrace pulse amplitude.

4. A circuit according to claims 1, 2 or 3 including means for developing a signal representative of ultor current variations and means for applying said ultor current variations representative signal to said control circuit to control the conduction time of said controllable switch so as to vary said trace voltage in a manner maintaining raster size substantially unchanged by said ultor current variations.

5. A circuit according to claim 1 wherein said load circuit comprises an audio circuit and said load current corresponds to the current being drawn by said audio circuit.

6. A circuit according to claim 5 wherein a component of the current in said other flyback transformer winding varies at an audio rate.

7. A circuit according to claims 1 or 5 including an inductance in a series arrangement with said controllable switch and said other flyback transformer winding across first and second terminals, said supply voltage being applied to said first terminal to generate current in said inductance upon turn-on of said controllable switch.

8. A circuit according to claim 7 wherein said inductance comprises the leakage inductance between said other flyback transformer winding and a flyback transformer winding coupled to said deflection generator.

9. A circuit according to claim 7 wherein said control circuit turns on said controllable switch at a controlled instant within the trace interval of each deflection cycle.

10. A circuit according to claim 9 wherein a DC voltage is developed at said second terminal with a magnitude determined by the conduction time of said controllable switch.

11. A circuit according to claim 10 wherein said deflection generator comprises a trace switch parallelly arranged with a retrace capacitor and with the series arrangement of a trace capacitance and said deflection winding, a primary winding of said flyback transformer being coupled between said second terminal and said trace switch.

12. A regulated deflection circuit, comprising:
a deflection winding;
a deflection generator coupled to said defelection winding for developing a retrace pulse voltage across said deflection winding each deflection cycle;
a flyback transformer coupled to said deflection generator for developing retrace pulse voltages across windings of said flyback transformer;
a source of unregulated input supply voltage;
a controllable switch series coupled with a first winding of said flyback transformer across said source for developing a DC input voltage at an output terminal of said switch;
a high voltage circuit coupled to a second, high voltage winding of said flyback transformer for developing an ultor accelerating potential from the retrace pulse voltage developed across said high voltage winding, said high voltage circuit drawing an ultor current from said high voltage winding;
means for applying said DC input voltage to said deflection generator for generating scanning current in said deflection winding each deflection cycle;
an auxiliary supply circuit coupled to a third winding of said flyback transformer for developing an auxiliary DC supply voltage from the voltage developed across said third winding;
an audio amplifier circuit coupled to said auxiliary supply circuit and responsive to a sound information input voltage for providing audio rate modulated power to an audio load, said audio amplifier drawing an audio load current from said third winding;
a control circuit coupled to said controllable switch for varying the conduction time of said switch;
means for developing a signal representative of variations of said DC input voltage;
means for applying said DC input voltage variations representative signal to said control circuit to vary the conduction time of said controllable switch in a manner that opposes said variations of said DC input voltage;
means for developing a signal representative of variations of said audio load current, said audio load current variations resulting in variations in retrace pulse voltage amplitude; and
means for applying said audio load current variations representative signal to said control circuit to vary said conduction time of said controllable switch so as to vary said DC input voltage in a manner maintaining raster size substantially unchanged by said audio load current variations.

13. A circuit according to claim 12 wherein said audio load current variations representative signal applying means varies said conduction time so as to vary said DC input voltage in the same sense as said variations in retrace pulse voltage amplitude.

14. A circuit according to claims 12 or 13 wherein the retrace pulse voltage developed in said first winding commutates off said controllable switch each deflection cycle.

15. A circuit according to claims 12 or 13 including means for developing a signal representative of ultor current variations and means for applying said ultor current variations representative signal to said control circuit to control the conduction time of said controllable switch so as to vary said DC input voltage in a manner maintaining raster size substantially unchanged by said ultor current.

16. A circuit according to claims 12 or 13 including means for developing a signal representative of variations in said unregulated supply voltage and means for applying said unregulated supply voltage variations representative signal to said control circuit to vary said conduction time so as to vary said DC input voltage in the same sense as said variations of said unregulated supply voltage.

* * * * *